(12) United States Patent
Asano

(10) Patent No.: US 6,755,368 B2
(45) Date of Patent: Jun. 29, 2004

(54) RECORDING TAPE CASSETTE

(75) Inventor: Katsuki Asano, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/428,044

(22) Filed: May 2, 2003

(65) Prior Publication Data
US 2003/0209622 A1 Nov. 13, 2003

(30) Foreign Application Priority Data
May 9, 2002 (JP) ........................................ 2002-133609

(51) Int. Cl.$^7$ ........................................... G11B 23/087
(52) U.S. Cl. ........................................ 242/341; 242/347
(58) Field of Search ................................ 242/341, 345, 242/346, 347, 615.2; 360/132

(56) References Cited

U.S. PATENT DOCUMENTS

| | | | | |
|---|---|---|---|---|
| 3,497,157 A | * | 2/1970 | Youngquist et al. | ........ 242/347 |
| 4,552,322 A | * | 11/1985 | Waugh | ........................ 242/341 |
| 4,660,116 A | * | 4/1987 | Westfall et al. | ............. 360/132 |
| 4,745,508 A | * | 5/1988 | Tollefson | ..................... 242/346 |
| 4,932,604 A | * | 6/1990 | Maehara et al. | ............ 242/345 |
| 5,074,486 A | * | 12/1991 | Vollmann | .................... 360/132 |
| 5,348,243 A | * | 9/1994 | Ohmachi et al. | ........... 242/347 |
| 5,657,936 A | * | 8/1997 | Ohgi et al. | .................. 242/345 |

FOREIGN PATENT DOCUMENTS

JP          7-312061 A          11/1995

* cited by examiner

Primary Examiner—William A. Rivera
(74) Attorney, Agent, or Firm—Sughrue Mion, PLLC

(57) ABSTRACT

A recording tape cassette has a reel which has a hub around which a recording tape is wound, and a flange which is mounted to an end portion of the hub and in which a concave portion is formed at an inner surface of the flange. The reel is rotatably accommodated in a case. A distance of a path of the recording tape from an inner peripheral edge portion of an outer side of the concave portion to an outer peripheral edge portion of the flange, is longer than a distance of a path of the recording tape from the outer peripheral edge portion of the flange to a tape guide at which the recording tape which is drawn out from the reel is first guided.

10 Claims, 6 Drawing Sheets

RECORDING TAPE CASSETTE

BACKGROUND OF THE INVENTION

1. Technical Field

The present invention relates to a recording tape cassette which accommodates, within a case, a reel on which a recording tape, such as a magnetic tape, is wound.

2. Description of the Related Art

Generally, magnetic tape cassettes having a magnetic tape as a recording tape are widely used in audio devices, or video devices which are recording/playback devices. For example, in a magnetic tape cassette which is used for business at a broadcasting station, a pair of reels are rotatably accommodated in a case which is formed by joining together an upper case and a lower case formed of a synthetic resin. A magnetic tape is wound on one reel. The distal end of the magnetic tape is attached to the other reel. By drawing the magnetic tape out from the one reel to the other reel, information is recorded on the magnetic tape, or information recorded on the magnetic tape is played back.

Each reel on which the magnetic tape is wound is structured by a lower flange, a hub fixed integrally to the upper side of the lower flange, and an upper flange mounted to the upper side of the hub. The distal end of the magnetic tape is attached to the hub, and the magnetic tape is wound onto the outer peripheral surface of the hub. The magnetic tape wound on the hub is held by the upper flange and the lower flange. Further, a plurality of concave portions (grooves), which are substantially fan-shaped as seen in plan view, are formed in the inner surface of the lower flange. These concave portions remove the air which is carried in between the magnetic tape wound around the hub and the magnetic tape (hereinafter called "accompanying air"), so as to improve the wound form of the magnetic tape when the magnetic tape is wound on the reel.

Further, the magnetic tape is exposed at the center of the front wall of the case so that a recording/playback head of a recording/playback device can slidingly contact the magnetic tape. When the magnetic tape cassette is not in use (is not loaded in a recording/playback device), the front wall of the case is covered by a cover. The cover is structured so as to be able to be pivoted upwardly. When the magnetic tape cassette is being used (is loaded in a recording/playback device), the cover is withdrawn to above the case, such that the magnetic tape is exposed. Moreover, a metal shaft, which is shaped as a long, thin, solid cylinder, stands upright at the inner side of the front wall of the case. A guide roller formed of synthetic resin is fit with play at this shaft, and is supported at the shaft so as to be able to rotate freely. The magnetic tape which has been drawn out from the reel is trained around this guide roller such that the conveying stability of the magnetic tape is ensured.

However, magnetic tapes have been made to be thinner as the recording capacities thereof have increased, and thinner magnetic tapes are weaker. Moreover, when the surface area of the inner surface of the lower flange which supports the magnetic tape wound on the hub is reduced due to the formation of the concave portions for removing the accompanying air, the supporting strength by which the magnetic tape is supported from the inner surface of the lower flange also decreases. As a result, the magnetic tape which is drawn out from the reel cannot be sufficiently supported. The movement of the magnetic tape up to the guide roller where the magnetic tape is first trained (guided) after being drawn out from the reel increases, and it becomes easy for the magnetic tape itself to deform.

SUMMARY OF THE INVENTION

An object of the present invention is to provide a recording tape cassette in which, even if a recording tape (such as a magnetic tape) wound on a reel is thin and deforms easily, the recording tape can be supported well up to a tape guide (such as a guide roller) at which the recording tape is first guided after being drawn out from a reel.

In order to achieve the above object, the recording tape cassette of the present invention, in which a reel is rotatably accommodated in a case, is structured so as to satisfy the following conditions. The reel has a hub around which a recording tape is wound, and a flange which is mounted to an end portion of the hub and in whose inner surface a concave portion is formed. A distance of a path of the recording tape from an inner peripheral edge portion of an outer side of the concave portion to an outer peripheral edge portion of the flange, is longer than a distance of a path of the recording tape from the outer peripheral edge portion of the flange to a tape guide at which the recording tape which is drawn out from the reel is first guided.

In accordance with this structure, the portion of the recording tape up to the tape guide which first guides the recording tape after the recording tape is drawn out from the reel, can be suitably supported at the flange of the reel. Accordingly, even if the recording tape is thin, deformation thereof can be suppressed.

DETAILED DESCRIPTION OF THE EMBODIMENT

Hereinafter, an embodiment of the present invention will be described in detail on the basis of the drawings. Note that, for convenience of explanation, the direction of loading the recording tape cassette into a recording/playback device (an audio device, or a video device) is called the front direction (FR). The rear direction (RE), the upward direction (UP), the downward direction (LO), the left direction (LE) and the right direction (RI) are defined with the front direction being used as the reference. Further, a magnetic tape is used as the recording tape. Hereinafter, the present invention will be described in connection with a magnetic tape cassette 10.

Figure 1:
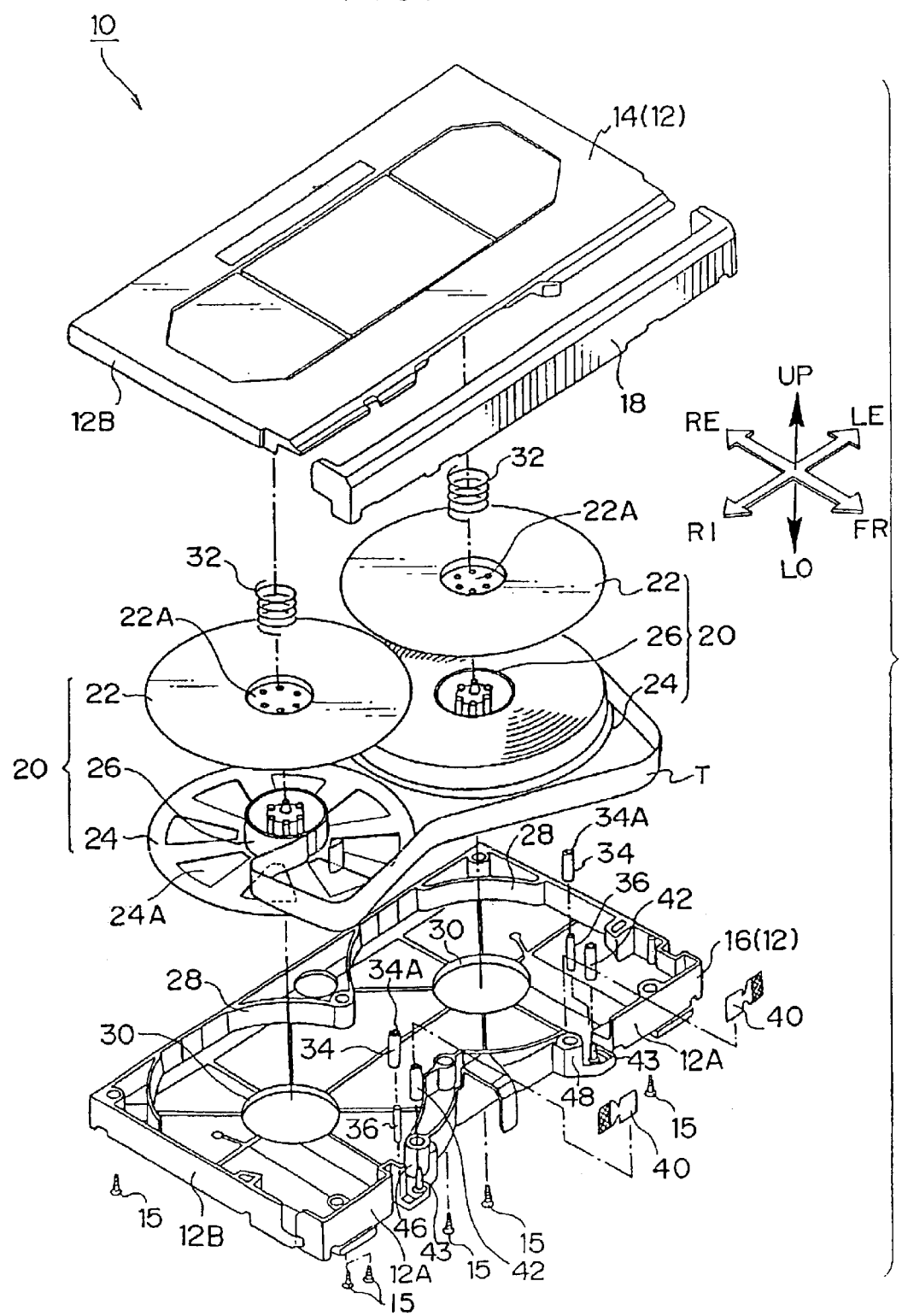
FIG. 1 is a schematic exploded perspective view, as seen from above and at an angle, of a magnetic tape cassette relating to the present invention.

First, the basics of the magnetic tape cassette 10 will be described. As shown in FIG. 1, the magnetic tape cassette (betacam L cassette) 10, which is used, for example, at a broadcasting station, has a substantially rectangular box-shaped case 12 whose left-right direction dimension is longer than the front-back direction dimension thereof. The case 12 is formed by joining an upper case 14 and a lower case 16 together by a plurality of mounting screws 15 which are screwed in from the bottom surface of the lower case 16. A cover 18 which covers a front wall 12A of the case 12 is provided at the front wall 12A.

The both end portions of the cover 18 are pivotally supported at the front ends of side walls 12B of the case 12, such that the cover 18 can pivot upwardly. The cover 18 covers a magnetic tape T which is exposed at the center of the front wall 12A of the case 12. Namely, when the magnetic tape cassette 10 is not loaded in a recording/playback device, the cover 18 is disposed in front of the front wall 12A of the case 12 so as to cover the magnetic tape T. When the magnetic tape cassette 10 is loaded in a recording/playback device, the cover 18 is pivoted and withdrawn to the upper side of the upper case 14 such that a recording/playback head (not illustrated) can slidingly contact the magnetic tape T which is exposed at the center of the front wall 12A of the case 12.

A pair of play regulating walls 28, which are formed in substantially cylindrical shapes, stand erect at the inner surface of the lower case 16. A pair of reels 20 are rotatably accommodated at inner sides of the play regulating walls 28. Each reel 20 is formed by a lower flange 24, a hub 26 fixed integrally to the top side of the lower flange 24, and an upper flange 22 which is mounted to the top side of the hub 26. When the magnetic tape cassette 10 is not being used, usually, one end of the magnetic tape T is attached to and wound about the hub 26 of either one of the reels 20, whereas the other end of the magnetic tape T is attached to the hub 26 of the other reel 20.

Figure 3:
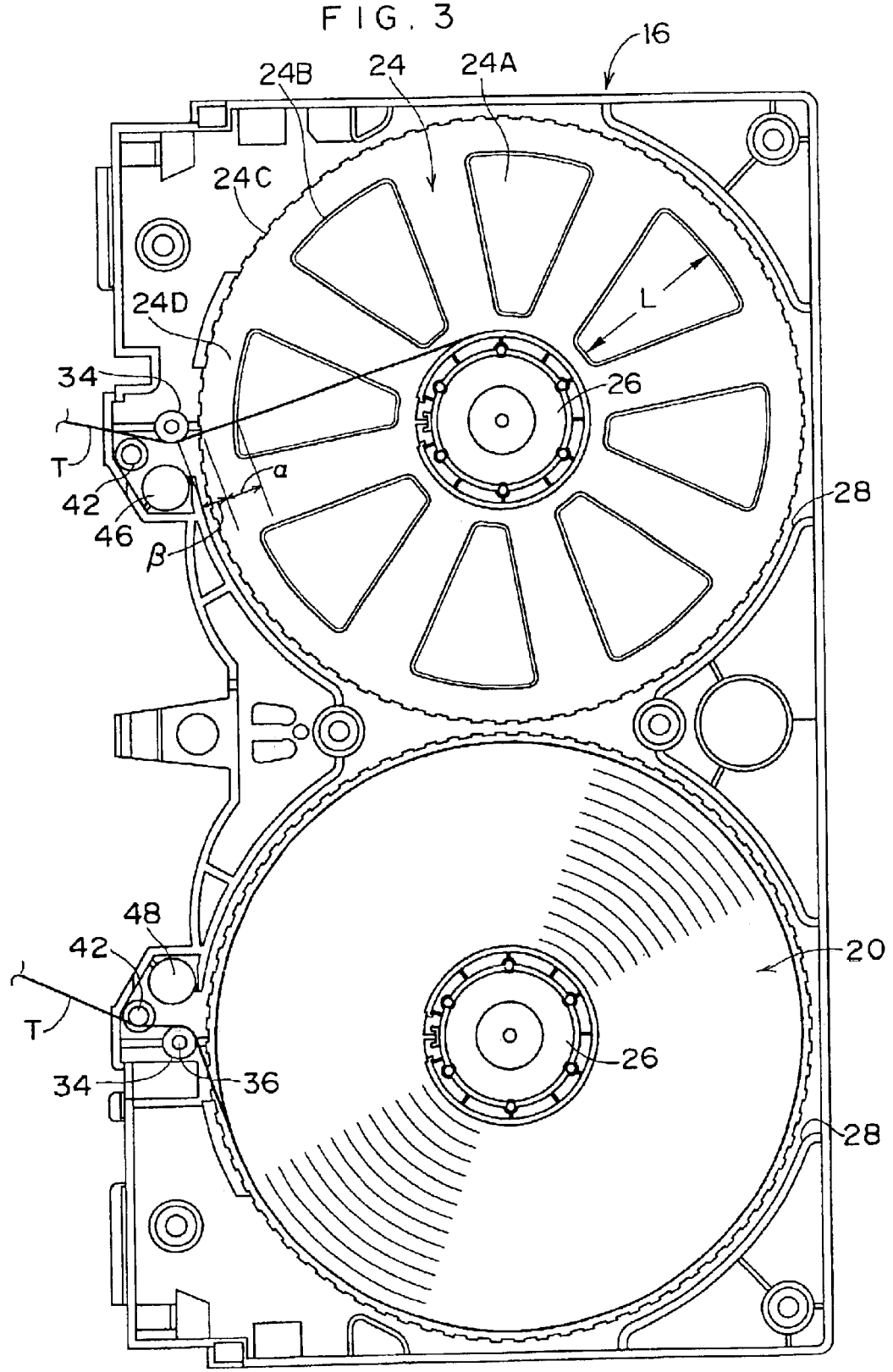
FIG. 3 is a schematic plan view of a lower case in which reels are accommodated.

A gear 24C is formed at the outer peripheral edge portion of the lower flange 24. Due to a brake member (not illustrated) provided within the case 12 engaging with the gear 24C so as to lock the reel 20, slackness in the winding of the magnetic tape T wound on the reel 20 is prevented when the magnetic tape cassette 10 is not being used. A plurality (eight in the illustrated embodiment) of concave portions (groove portions) 24A for removal of the accompanying air which is carried in between the magnetic tape T and the magnetic tape T, are formed in the inner surface of the lower flange 24. The concave portion 24A is formed to be substantially fan-shaped in plan view such that the outer side thereof is wider (see FIG. 3). The magnetic tape T is held by the upper flange 22 and the lower flange 24 in the state in which the magnetic tape T wound on the hub 26 is supported from beneath by the surface other than the concave portions 24A.

Figure 4:
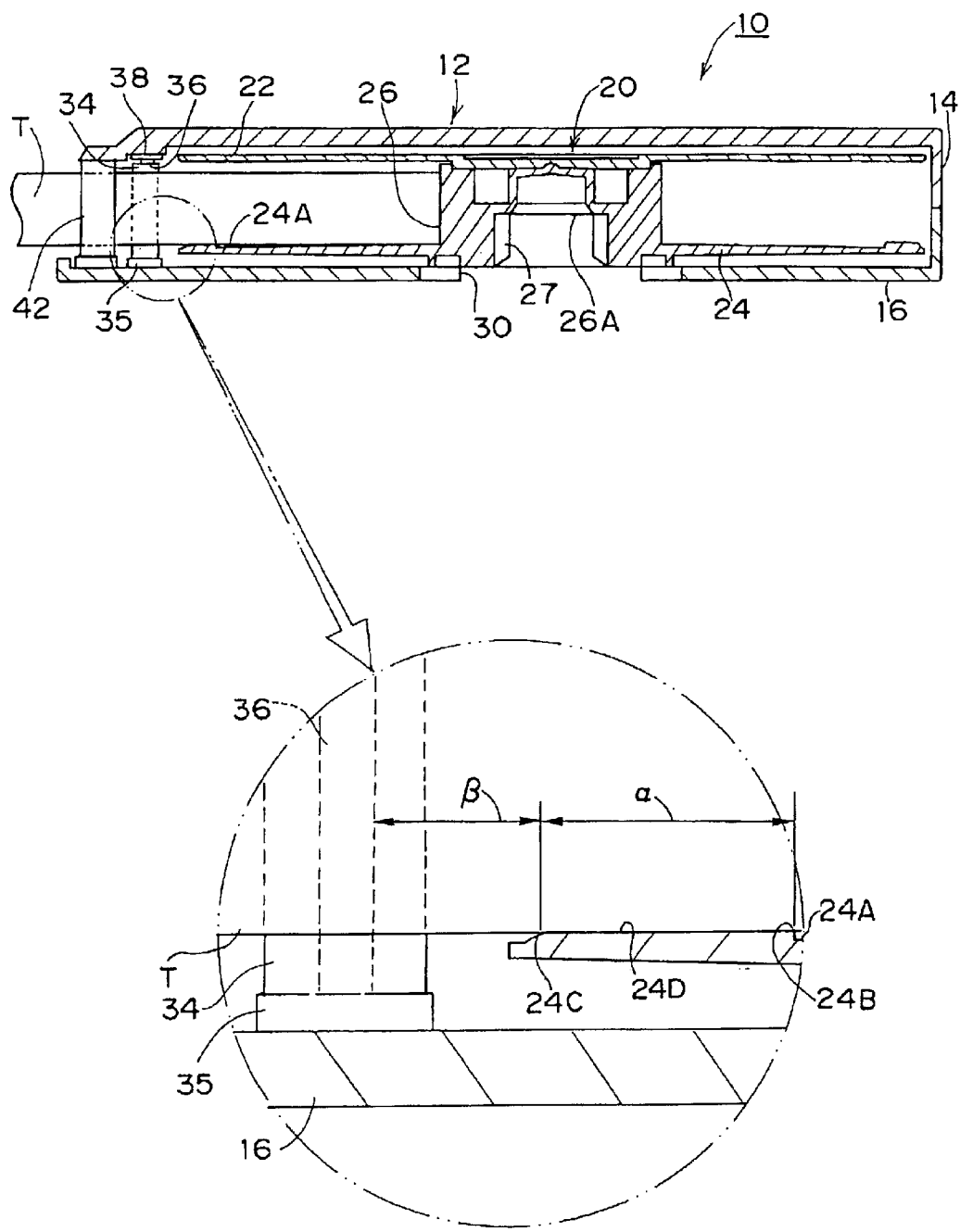
FIG. 4 is a schematic side sectional view of a case in which the reels are accommodated.

A concave portion 22A is formed in the center of the top surface of the upper flange 22. A compression coil spring 32 is inserted within the concave portion 22A. The bottom end of the compression coil spring 32 is supported at the bottom surface of the concave portion 22A. The top end of the compression coil spring 32 is supported at the inner surface of the upper case 14. The compression coil springs 32 urge the reels 20 toward the lower case 16. A circular hole portion 26A is formed in the bottom surface of the axially central portion of the hub 26. A gear 27 for reel rotation is formed at the inner peripheral edge of the hole portion 26A (see FIG. 4).

A pair of open holes 30 are formed in the lower case 16 so as to allow the gears 27 for reel rotation, which are provided at the bottom surfaces of the respective reels 20, to emerge out. When the magnetic tape cassette 10 is loaded into a recording/playback device, driving gears (not illustrated) provided within the recording/playback device enter into the hole portions 26A from the open holes 30 and mesh with the gears 27 for reel rotation, such that the pair of reels 20 can rotate.

Moreover, reference holes for positioning with respect to a recording/playback device are formed in the bottom surface of the front portion of the lower case 16. The reference holes are formed at the inner portions of bag portions 46, 48 which project toward the interior of the case 12. The reference hole formed in the one (e.g., the right side) bag portion 46 is circular in plan view, whereas the reference hole formed in the other (left side) bag portion 48 is, as seen in plan view, a substantial oval which is long along the left-right direction. When the magnetic tape cassette 10 is loaded into a recording/playback device, positioning members (not illustrated) such as pins enter into the reference holes, such that the front-back direction and left-right direction position of the magnetic tape cassette 10 within the recording/playback device is regulated.

At the inner surface of the front portion of the lower case 16, solid cylindrical bosses 35 (see FIG. 4) project to predetermined heights, at positions further toward the outer sides than the reference holes (the bag portions 46, 48). Holding holes (not illustrated), which are substantially square as seen in plan view, are formed in these bosses 35. A pair of shafts 36, which are long, thin, solid-cylindrical, and formed of metal, are inserted into the holding holes. The shafts 36 stand erect so as to be perpendicular to the lower case 16. Guide rollers 34 are fit with play on the shafts 36. A through hole 34A, which is circular in plan view, is formed in the guide roller 34 along the central axis thereof.

Solid cylindrical bosses 38 (see FIG. 4) project to predetermined heights at the inner surface of the front portion of the upper case 14. Holding holes (not illustrated), which are substantially circular as seen in plan view, are formed in the bosses 38. The upper ends of the shafts 36 are inserted into these holding holes. The guide rollers 34 are supported so as to be freely rotatable around the shafts 36, and are held in a state of being perpendicular with respect to the lower case 16 and the upper case 14. While the magnetic tape T is guided by the guide rollers 34, the magnetic tape T is conveyed (drawn out or rewound) stably from one of the reels 20 to the other reel 20. Thus, the guide rollers 34 are often molded from a synthetic resin which is smooth and which has relatively high mechanical strength, e.g., a resin such as POM.

Tape pads 40 are provided in vicinities of the guide rollers 34. The tape pads 40 slidingly contact the reverse surface side of the magnetic tape T, and press the magnetic tape T from the reverse surface side, and prevent the magnetic tape T from going slack. The magnetic tape T is conveyed while being pressed by the tape pads 40 at a proper degree of urging force. Accordingly, problems such as the magnetic tape T being bitten-into or scratched do not arise.

Figure 2:
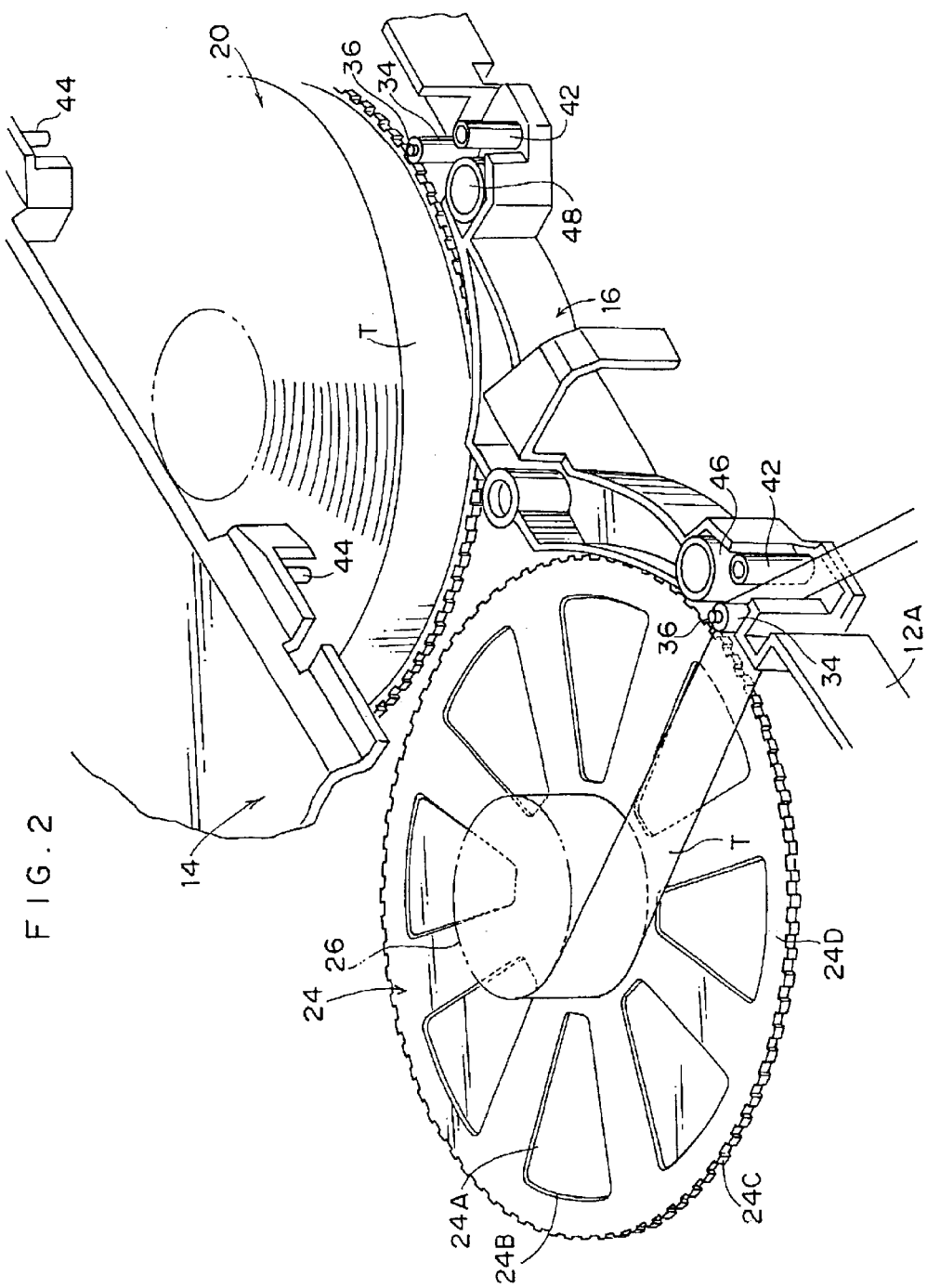
FIG. 2 is a schematic exploded perspective view, as seen from above and at an angle, of main portions of a front wall side of the magnetic tape cassette relating to the present invention.

Pins 43 stand erect to predetermined heights at the inner surface of the lower case 16 between the guide rollers 34 and the reference holes (the bag portions 46, 48), further forward than the tape pads 40. Lower ends of metal, cylindrical shafts 42 are fit on these pins 43. The upper ends of the shafts 42 are fit on solid-cylindrical projections 44 (see FIG. 2) projecting at the inner surface of the upper case 14. The shafts 42 are held (fixed) perpendicular to the upper case 14 and the lower case 16, in a state of not being able to rotate. Note that the reverse surface side (which is the non-recording surface) of the magnetic tape T is wound around the shafts 42, such that the shafts 42, together with the guide rollers 34, guide the magnetic tape T.

In this way, the magnetic tape T, while being guided by the guide rollers 34 and the shafts 42 which serve as tape guides, is pulled out from the front wall 12A side of the case 12 through a predetermined path, and is slidingly contacted by the recording/playback head of the recording/playback device. Next, description will be given of the relationship between the magnetic tape T which is wound on the reel 20, the lower flange 24 at which are formed the concave portions 24A which are substantially fan-shaped as seen in plan view, and the guide roller 34 at which the magnetic tape T which is drawn out from the reel 20 is first trained (guided).

Namely, as shown in FIGS. 2 through 5, at the path of the magnetic tape T (a rectilinear path to the guide roller 34), when an inner peripheral edge portion 24B of the outer side of the concave portion 24A crosses the magnetic tape T as seen in plan view (i.e., when the inner peripheral edge portion 24B of the outer side of the concave portion 24A is near to and opposes the guide roller 34), a distance $\alpha$ from the inner peripheral edge portion 24B of the outer side of the concave portion 24A to the outer peripheral edge portion (gear) 24C of the lower flange 24, is always longer than a distance $\beta$ from the outer peripheral edge portion (gear) 24C of the lower flange 24 to the point where the magnetic tape T contacts (is trained about) the guide roller 34.

Specifically, for example, a length L, in the radial direction of the lower flange 24, of the concave portion 24A which is substantially fan-shaped as seen in plan view, is formed to be a predetermined length short, such that the surface area of an inner surface 24D between the inner peripheral edge portion 24B of the outer side of the concave portion 24A and the outer peripheral edge portion (gear) 24C of the lower flange 24 is larger.

By using such a structure, even if there is no member which supports the magnetic tape T from beneath from the outer peripheral edge portion (gear) 24C of the lower flange 24 to the point where the magnetic tape T contacts the guide roller 34, the magnetic tape T can be sufficiently and suitably supported by the inner surface 24D (the inner surface between the inner peripheral edge portion 24B and the outer peripheral edge portion 24C) in a vicinity of the outer peripheral edge portion (gear) 24C of the lower flange 24. Thus, even if the magnetic tape T is thin, the deformation thereof can be suppressed. In particular, this effect can be markedly seen when the thickness of the magnetic tape T is 12 $\mu$m or less.

Figure 5:
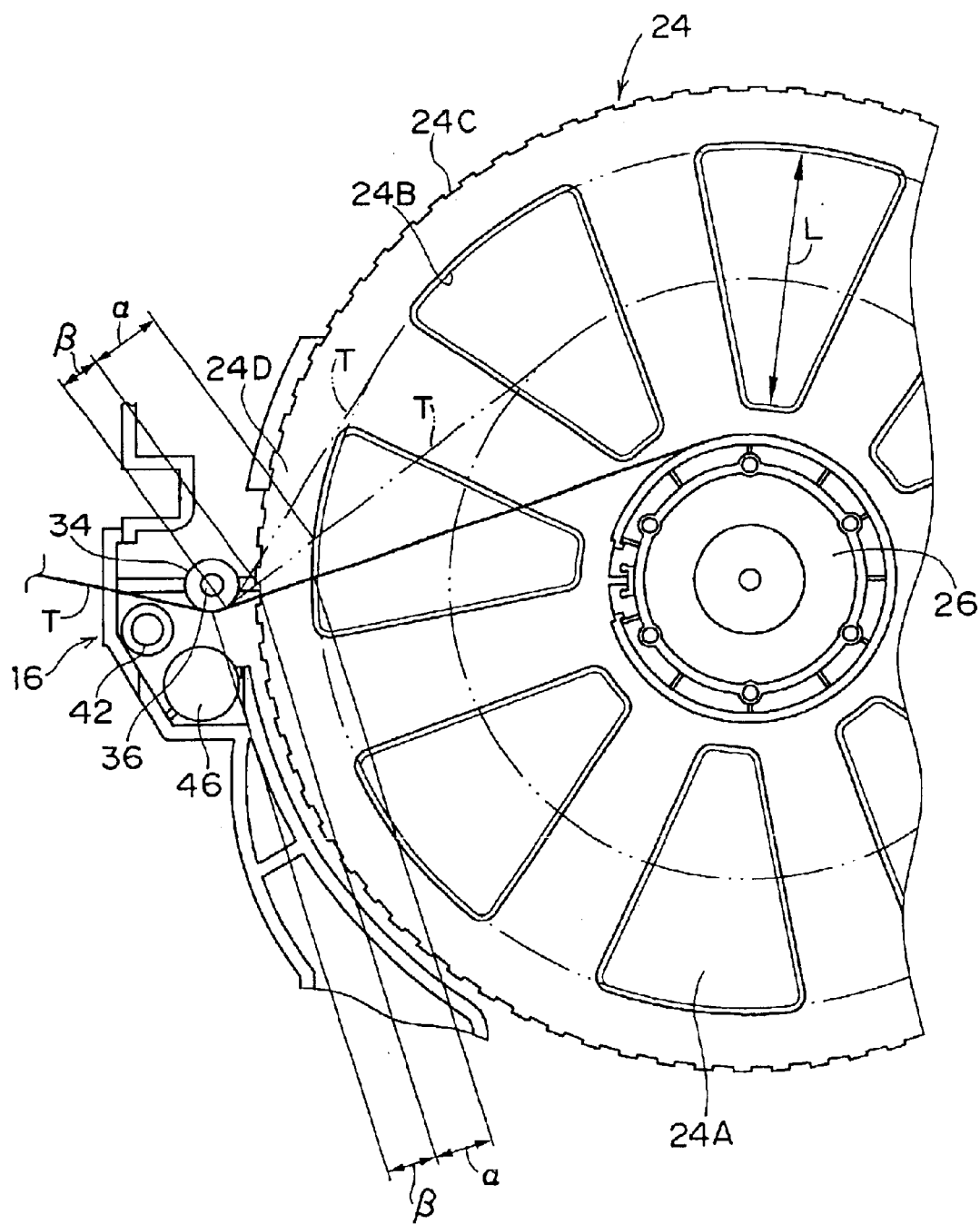
FIG. 5 is a schematic plan view showing the relationship between a concave portion and a wound amount of a magnetic tape wound on the reel.
Figure 6A:
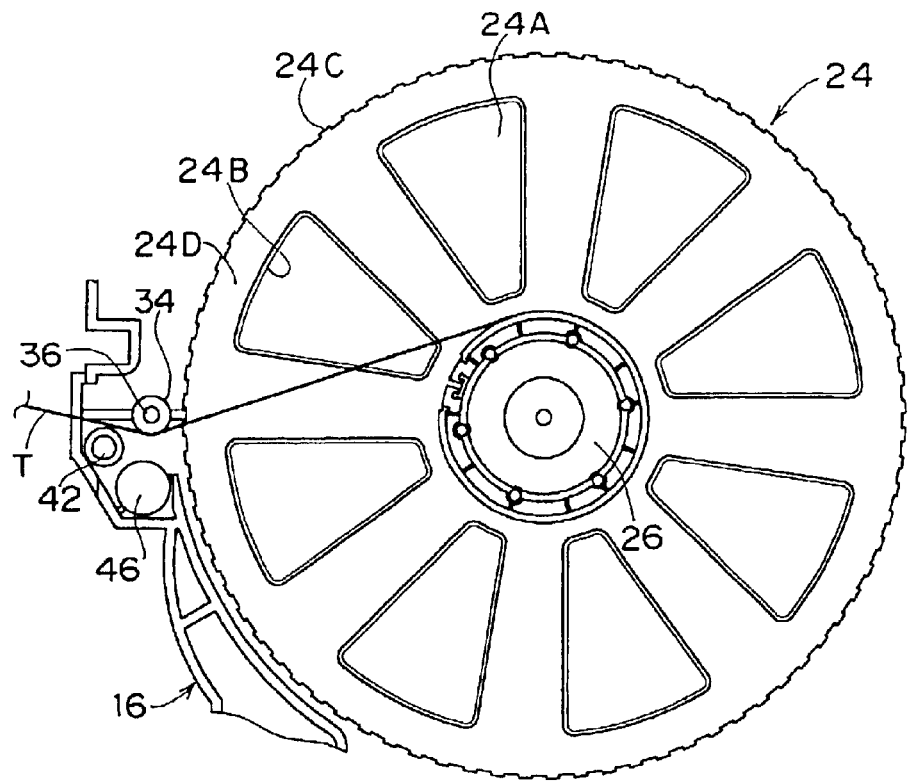
FIGS. 6A and 6B are schematic plan views showing the relationship between the magnetic tape and the position of the concave portion at the time when the reel is rotated.
Figure 6B:
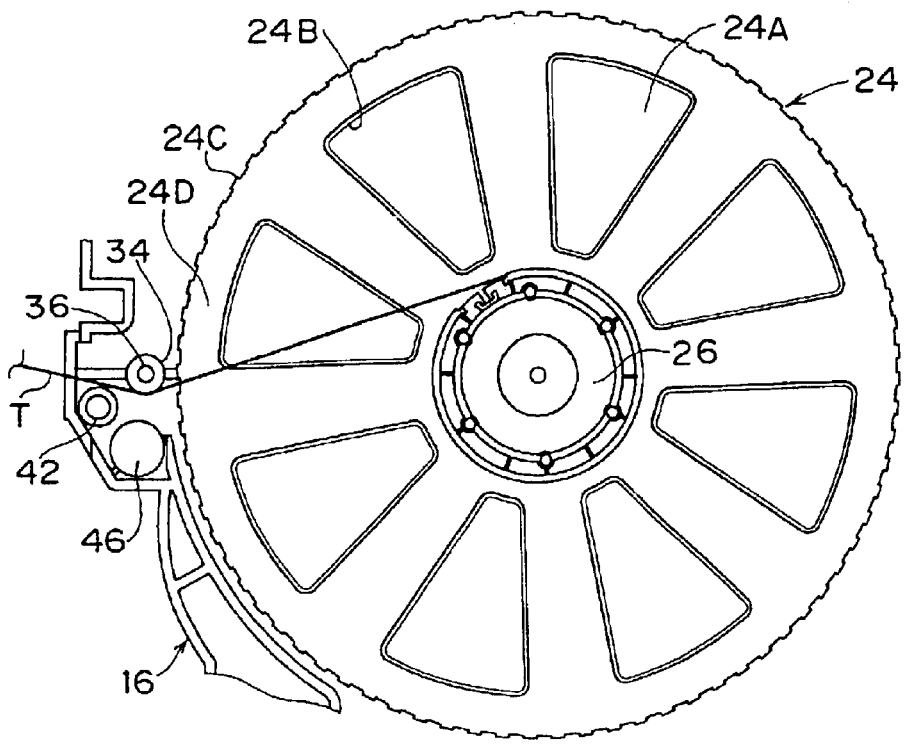

Note that, as shown in FIG. 5, the path of the magnetic tape T (a rectilinear path until the guide roller 34) changes in accordance with the wound amount of the magnetic tape T which is wound on the hub 26. The positions of the concave portions 24A also change in accordance with the rotation of the reel 20 (the lower flange 24) as shown in FIGS. 6A and 6B. The relationship between the distance a and the distance $\beta$ does not depend on the wound amount of the magnetic tape T wound on the hub 26 nor on the position of the concave portion 24A, and is such that $\alpha > \beta$ always when the magnetic tape T crosses, in plan view, the inner peripheral edge portion 24B at the outer side of the concave portion 24.

Namely, as shown in FIG. 5, when the amount of the magnetic tape T which is wound on the hub 26 (i.e., the wound amount) is large to the extent that it covers the concave portions 24A, the path (the rectilinear path up to the guide roller 34) does not pass over the concave portions 24A. Thus, the distance over which the magnetic tape T exists on the inner surface 24D of the lower flange 24 is long. Moreover, as shown in FIG. 6A, also when the magnetic tape T does not cross the inner peripheral edge portion 24B at the outer side of the concave portion 24A, the distance over which the magnetic tape T exists on the inner surface (including the inner surface 24D) of the lower flange 24 is long.

Accordingly, at such times, the magnetic tape T is suitably supported by the inner surface (including the inner surface 24D) of the lower flange 24. In the state in which the wound amount has decreased, when the path of the magnetic tape T crosses the inner peripheral edge portion 24B of the outer side of the concave portion 24A due to rotation of the reel 20, the surface area of the inner surface of the lower flange 24 which supports the magnetic tape T is decreased due to the concave portion 24A. In such a case, $\alpha > \beta$ always in order for the magnetic tape T to be suitably supported.

Moreover, the structure in which the distance $\alpha$ from the inner peripheral edge portion 24B of the outer side of the concave portion 24A to the outer peripheral edge portion (gear) 24C of the lower flange 24, is longer than the distance $\beta$ from the outer peripheral edge portion (gear) 24C of the lower flange 24 to the point where the magnetic tape T contacts the guide roller 34, is not limited to the illustrated structure. The configuration of the concave portion 24A itself is not limited to a substantially fan-shaped configuration, and an arbitrary substitute configuration of a different shape maybe employed. In other words, conversely, the configuration of the concave portion 24A may be appropriately changed provided that $\alpha > \beta$.

What prescribes the distance $\beta$ is not limited to the guide roller 34. It suffices for the distance $\beta$ to be prescribed by the tape guide at which the magnetic tape T drawn out from the reel 20 is first trained (guided). For example, a tape guide provided at the magnetic tape cassette 10 (the guide roller 34, the shaft 42) may prescribe the distance $\beta$. Or, the distance $\beta$ may be prescribed by tape guide (not shown) provided at the recording/playback device. However, it goes without saying that at each reel 20, the relation $\alpha > \beta$ must be established.

Next, operation in the magnetic tape cassette 10 which is structured as described above will be described. When the magnetic tape cassette 10 is not in use (is not loaded in a recording/playback device), it is stored in a state in which the magnetic tape T is wound on one of the reels 20 and only the distal end of the magnetic tape T is attached to the other reel 20, and both reels 20 are locked by the brake members engaging with the gears 24C. Further, the front wall 12A of the case 12 is covered by the cover 18.

When the magnetic tape cassette 10 is to be used, it is loaded into a recording/playback device. Then, the locking (engagement) of the brake members with the reels 20 is released, and the cover 18 is pivoted upwardly and withdrawn such that the magnetic tape T is exposed. The driving gears mesh with the gears 27 for reel rotation, and the rotational motion force from the driving gears is transferred to the gears 27 for reel rotation such that the reels 20 rotate. The magnetic tape T is drawn out from the one reel 20 to the other reel 20.

At this time, on the path of the magnetic tape T, the distance $\alpha$ from the inner peripheral edge portion 24B of the outer side of the concave portion 24A to the outer peripheral edge portion (gear) 24C of the lower flange 24, is always longer than the distance $\beta$ from the outer peripheral edge portion (gear) 24C of the lower flange 24 to the point where the magnetic tape T contacts the guide roller 34. Thus, regardless of the amount of the magnetic tape T wound on the hub 26 (the wound amount) and the positions of the concave portions 24A, the magnetic tape T is suitably supported from beneath by the inner surface of the lower flange 24 (including the inner surface 24D between the inner peripheral edge portion 24B and the outer peripheral edge portion 24C). In this state, the magnetic tape T is drawn out to the guide roller 34. Accordingly, even if the magnetic tape T is thin, e.g., is 12 μm or less, deformation of the magnetic tape T itself is suppressed.

In this way, while the magnetic tape T is drawn out from the one reel 20 to the other reel 20 via the guide rollers 34 and the shafts 42, the magnetic tape T is pulled out from the front wall 12A side of the case 12 and exposed. The recording/playback head of the recording/playback device slidingly contacts this exposed portion, and recording or playback of information is carried out. Note that, also when the magnetic tape T is rewound such as at the time when the magnetic tape cassette 10 is to be removed from the recording/playback device, by establishing the relationship α>β, the magnetic tape T is suitably supported from beneath by the inner surface (including the inner surface 24D) of the lower flange 24.

As described above, in accordance with the present invention, the portion of a recording tape, up to a tape guide which first guides the recording tape which has been drawn out from a reel, can be suitably supported by the flange of the reel. Accordingly, even if the recording tape is thin, deformation thereof can be suppressed.

What is claimed is:

1. A recording tape cassette in which a reel, which comprises a hub around which a recording tape is wound and a flange which is mounted to an end portion of the hub and in which a concave portion is formed at an inner surface of the flange, is rotatably accommodated in a case,
   wherein a distance of a path of the recording tape from an inner peripheral edge portion of an outer side of the concave portion to an outer peripheral edge portion of the flange, is structured to be longer than a distance of a path of the recording tape from the outer peripheral edge portion of the flange to a tape guide at which the recording tape which is drawn out from the reel is first guided.

2. The recording tape cassette of claim 1, wherein the tape guide is a guide roller which is supported so as to be perpendicular to the case and so as to rotate freely via a shaft.

3. The recording tape cassette of claim 2, wherein the guide roller is formed of a synthetic resin.

4. The recording tape cassette of claim 1, wherein the case includes an upper case and a lower case which can be joined together, and a pair of cylindrical play restricting walls are provided at an inner surface of the lower case, and a pair of the reels are rotatably accommodated at inner sides of the play restricting walls, and one end portion of the recording tape is attached to the hub of one of the reels, and another end portion of the recording tape is attached to the hub of another of the reels, and the flange has a lower flange and an upper flange, and at least one of the concave portions is provided in an inner surface of the lower flange.

5. The recording tape cassette of claim 4, wherein the concave portion is fan-shaped.

6. The recording tape cassette of claim 4, wherein a distance from the inner peripheral edge portion of the outer side of the concave portion to an outer peripheral edge portion of the lower flange is longer than a distance from the outer peripheral edge portion of the lower flange to a point where the recording tape contacts the guide roller.

7. The recording tape cassette of claim 1, wherein the recording tape is a magnetic tape.

8. The recording tape cassette of claim 7, wherein a thickness of the magnetic tape is 12 μm or less.

9. The recording tape cassette of claim 1, wherein the tape guide is a shaft which is fixed perpendicularly to the case.

10. A recording tape cassette comprising:
    a reel which has a hub around which a recording tape is wound, and at least one flange mounted to an end portion of the hub, a concave portion being formed in an inner surface of the flange;
    a case accommodating the reel; and
    a tape guide provided perpendicular with respect to the case, wherein the recording tape which is drawn out from the reel is first guided by the tape guide, and
    a distance of the recording tape from an inner peripheral edge portion of an outer side of the concave portion to an outer peripheral edge portion of the flange, is longer than a distance of the recording tape from the outer peripheral edge portion of the flange to the tape guide.

* * * * *